United States Patent [19]

Portmann

[11] 4,134,057
[45] Jan. 9, 1979

[54] DEVICE FOR ENABLING AN ACCUMULATOR TO BE RECHARGED FROM A SOURCE OF ELECTRICAL ENERGY

[75] Inventor: Hubert Portmann, Colombier, Switzerland

[73] Assignee: Ebauches S.A., Neuchatel, Switzerland

[21] Appl. No.: 746,124

[22] Filed: Nov. 30, 1976

[30] Foreign Application Priority Data

Dec. 10, 1975 [CH] Switzerland .................. 16036/75

[51] Int. Cl.² .......................... H02J 7/00; H02M 3/06
[52] U.S. Cl. .................................. 320/61; 58/23 BA; 320/21; 323/15; 363/60
[58] Field of Search ............... 323/15; 363/59, 60, 363/61; 320/2, 3, 9, 14, 15, 22, 31, 35, 39, 40, 61, 21, DIG. 1, 1; 58/23 C, 23 BA

[56] References Cited

U.S. PATENT DOCUMENTS

| | | | |
|---|---|---|---|
| 2,979,551 | 4/1961 | Pack | 320/61 X |
| 3,222,535 | 12/1965 | Engelhardt | 320/22 X |
| 3,775,659 | 11/1973 | Carlsen | 320/21 |
| 3,997,832 | 12/1976 | Tanaka et al. | 363/60 |

Primary Examiner—Robert J. Hickey
Attorney, Agent, or Firm—Imirie, Smiley & Guay

[57] ABSTRACT

A device for enabling an accumulator to be recharged from a source of electrical energy, such as photo-cells. The device includes a converter circuit and a diode, the converter circuit being capable of adapting the current and voltage supplied by said source to the charging conditions of the accumulator. The converter circuit is arranged to be saturated from a certain value of the current delivered by the source, the stronger currents passing directly through the diode.

10 Claims, 12 Drawing Figures

DEVICE FOR ENABLING AN ACCUMULATOR TO BE RECHARGED FROM A SOURCE OF ELECTRICAL ENERGY

The present invention relates to a device for enabling an accumulator to be recharged by means of an electric energy source, comprising a diode and a converter circuit capable of adapting voltage and current supplied by the source to the charged conditions of the accumulator.

Some transducers transform energy of any form such as mechanical, thermal, luminous, sound vibration, for example, into electrical energy. If the incident energy varies in an uncertain manner or according to a certain law, it is clear that the electrical values furnished by the transducer must be adapted to the characteristics of a receiver, in particular when it is a matter of an accumulator having to be recharged. To simplify the provision of a coverter circuit making it possible to solve this problem, photo-sensitive elements will be considered connected in series as transducers. However, it is obvious that the principle of this particular converter circuit may be used in other cases.

Means are already known to avoid overcharging the accumulator or for indicating an insufficient charge, said means being combined if desired with a device for releasing the load from a specific discharged condition.

It is known that the lighting conditions of wrist watches are usually bad, but that photo-sensitive elements having dimensions compatible with those of a watch may furnish enough power to contribute to its feed or even to ensure it, thus lengthening the useful life of the accumulator.

The problem raised by the use of solar cells to ensure the charging of the accumulator of a watch is as follows:

The current which an element can supply is proportional to the surface of this element.

The voltage on the terminals of the element is proportional to the lighting of this element.

In order to obtain a voltage sufficient to recharge an accumulator under poor lighting conditions, it is therefore necessary to have a large number of elements in series; but since the total surface is limited by the dimensions of the watch, the surface of each element is small and the available current weak.

Under good lighting conditions this large number of elements in series provides a voltage which is too high; the available energy is therefore badly used.

In order to utilize this energy more efficiently, it would be necessary, when the lighting exceeds a certain level, to divide the elements into two sets, each comprising one half of the elements, the two series being themselves connected in parallel. The voltage obtained would be reduced by a half relatively to all the elements connected in series, but the available current would be doubled. But this switching of the elements to be sometimes in series and sometimes in parallel series would have to be effected by means of transistors carrying the maximum current, a feature which implies relatively large dimensions. It is the object of the present invention to solve this problem.

According to the present invention there is provided a device for enabling the recharging of an accumulator by means of a source of electrical energy, comprising a diode and a converter circuit capable of adapting voltage and current fed by the said source to the charging conditions of the said accumulator, the said circuit comprising at least two inputs and one output, the said two inputs being connected to the terminals of the said source, and the said diode being mounted in parallel between one of the said inputs and the said source, and the said converter circuit being arranged to be saturated from a certain value of the current delivered by the said source, the stronger currents passing directly through the said diode, the currents weaker than the saturation value passing through the said converter circuit.

The present invention will be described further, by way of example, with reference to the accompanying drawings, in which.

Figure 3:
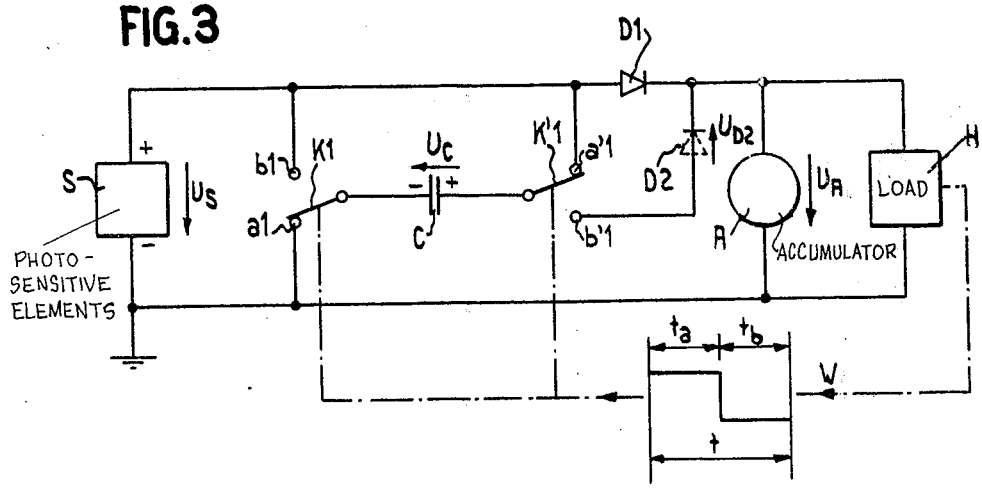
FIG. 3 shows a first embodiment of the present invention.
Figure 4:
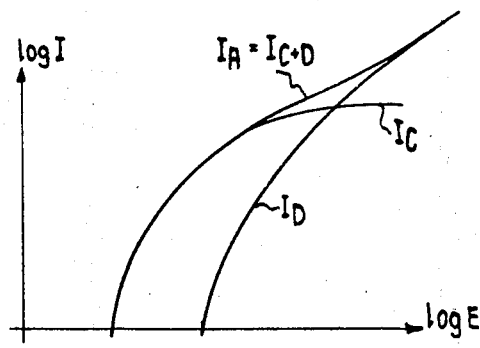
Figure 5:
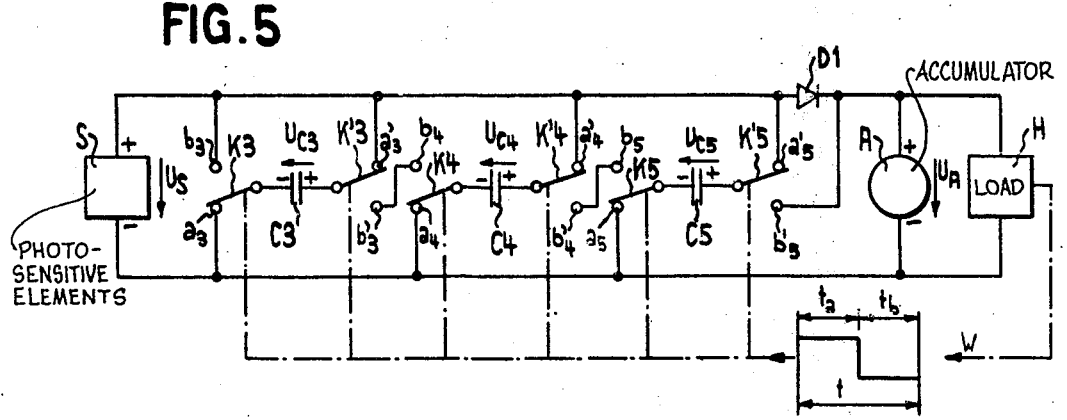
Figure 6:
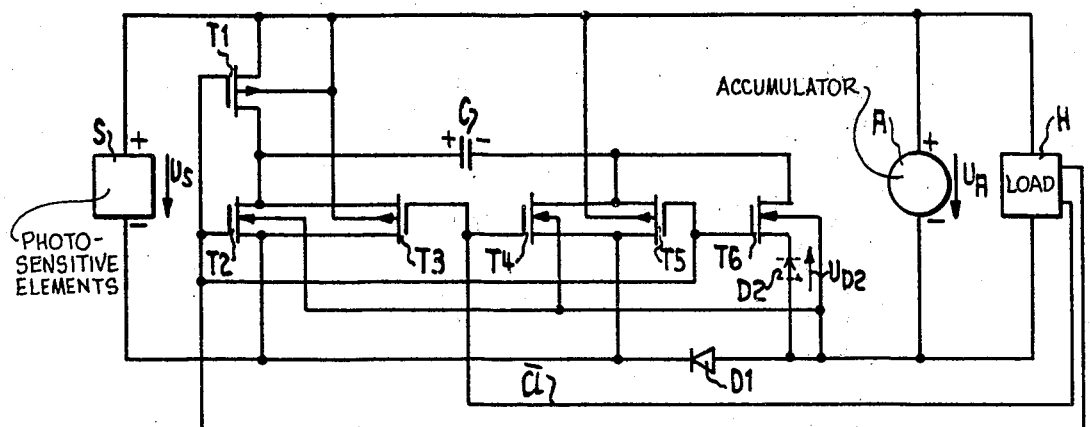
Figure 7:
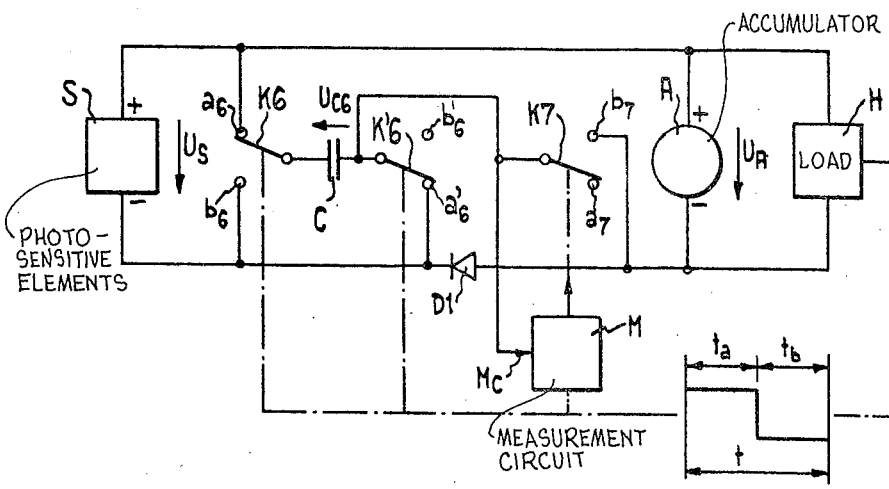
Figure 8:
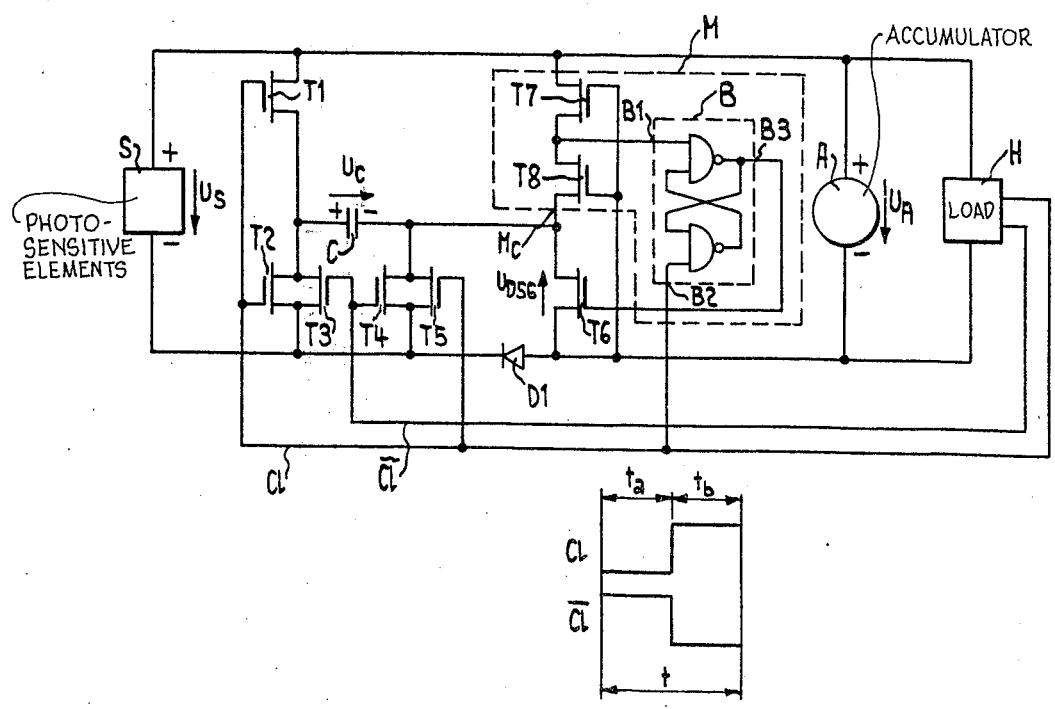
Figure 9:
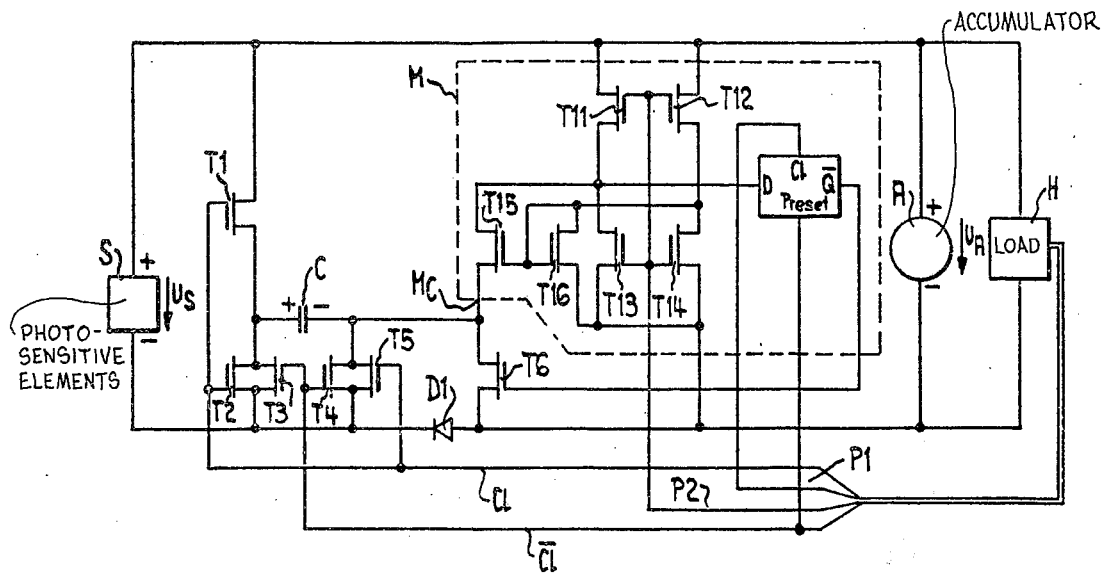
Figure 10:
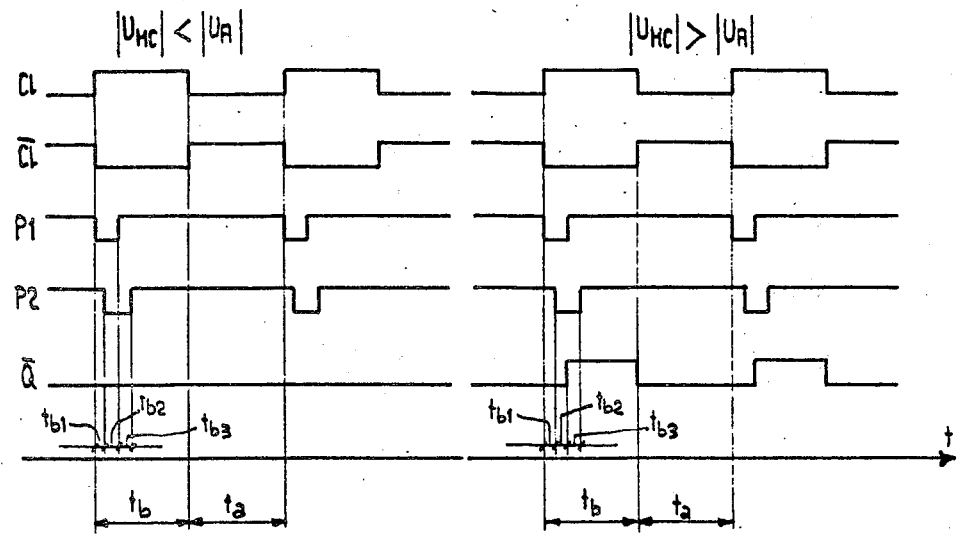
Figure 11:
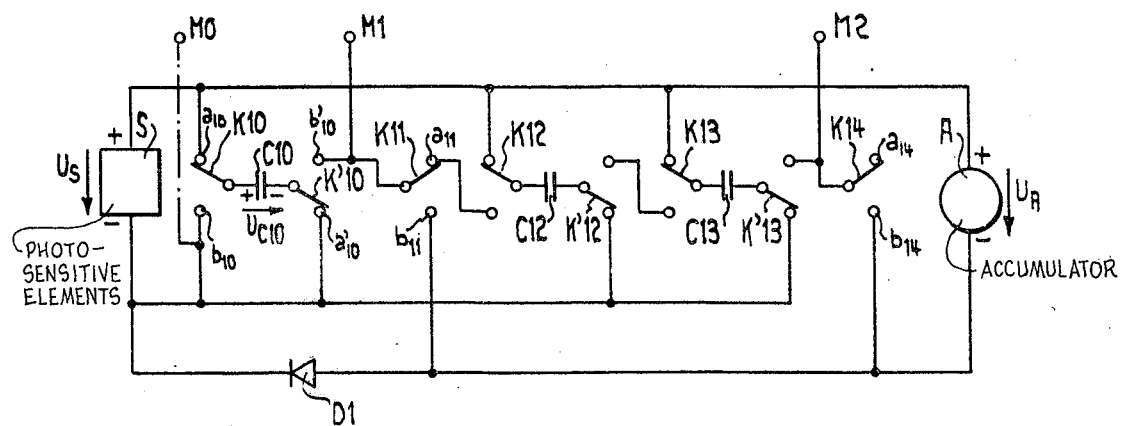

FIG. 4 helps to explain the operation of the circuit in FIG. 3;

FIG. 5 is a general view of the circuit shown in FIG. 3;

FIG. 6 shows the configuration of the converter shown in FIG. 3 using the C—MOS thechnology;

FIG. 7 is a basic circuit of an improved version of the converter which makes it possible to eliminate the inverse current;

FIG. 8 shows the configuration of the converter according to FIG. 7 using C—MOS technology;

FIG. 9 shows a variant of the circuit of FIG. 8, with another measurement circuit;

FIG. 10 is a waveform diagram to assist the understanding of the circuit in FIG. 9;

FIG. 11 shows a general view of the basic circuit in FIG. 7; and

Figure 12:
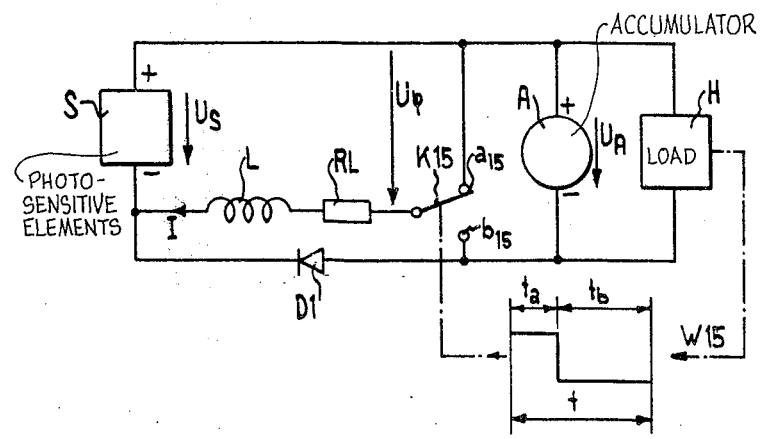

FIG. 12 shows the basic circuit of another variant of the invention with an inductive converter.

Figure 1:
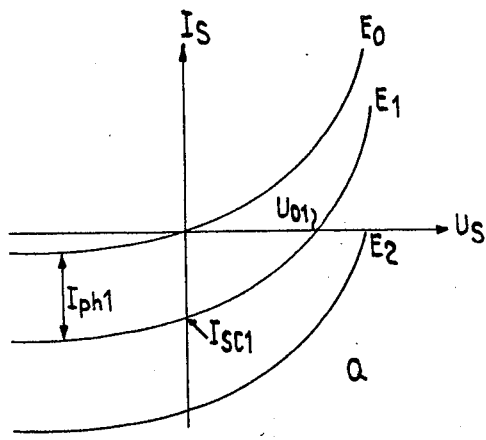
FIGS. 1 and 2 show the characteristics of a photo-sensitive element and the usual manner of utilizing a certain number of them to recharge an accumulator.

The behaviour of a silicon solar cell is described by the curves of FIG. 1 which show the current $I_S$ fed by the cell as a function of the voltage $U_S$ measured at its terminals for different values $E_0$, $E_1$, $E_2$ of illumination.

For zero illumination (curve $E_0$) the characteristic of the cell is that of a diode. For non-zero illumination, for example $E_1$, the curve is displaced by a value $I_{ph1}$. With this illumination $E_1$, measurement made with an open circuit (that is to say, with $I_S = 0$) gives a voltage in vacuo $U_{01}$, and in short circuit (that is to say, with $U_S = 0$) a short circuit current $I_{SC1}$. The latter is equal to the photo-current $I_{ph1}$. If the cell furnishes energy to a user, its working point is in the quadrant Q.

Figure 2:
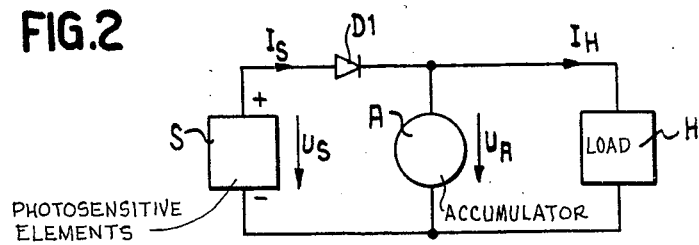

To recharge an accumulator, a device shown in FIG. 2 may be used, in which S represents the photo-elements, A an accumulator (which could be a battery), H a load (for example, the electronic circuits of an electronic watch) and D1 a diode which prevents the discharge of the accumulator in the photo-sensitive elements when the lighting is weak.

If it is desired to keep the accumulator charged, it is necessary to use several photo-sensitive elements mounted in series, since the voltage $U_O$ of an element does not exceed 0.5V even under the most favourable conditions of lighting (for example, in full sunshine at noon). The accumulator recharges when the sum of the voltages $U_O$ of all the elements connected in series exceeds the sum of the voltage of the accumulator and the threshold voltage of the diode D1. The average value of a current $I_S$ should then be at least equal to the value of the current $I_H$ consumed by the charge. However, since the accumulator is not ideal. it is ncessary that:

$$I_S = \alpha I_H \text{ with } 1.1 \leq \alpha \leq 1.7$$

A first embodiment of the present invention is shown in the circuit of FIG. 3, in which a capacitor C and two switches K1 and K'1 have been added to the circuit of FIG. 2 and which work synchronously and are controlled by a signal W, formed by pulses of a duration $t_a$ and $t_b$, of fixed frequency. This signal W originates, for example, from the load circuit H. The capacitor C is connected between the switches K1 and K'1 so that it is in parallel with the photo-sensitive elements S during the time $t_a$ in which the switches K1 and K'1 are in the positions a1 and a'1 respectively and it charges to a voltage $U_C$. At the end of the time $t_a$, K1 and K'1 change and remain in the positions b1, and b'1 respectively, during the time $t_b$; the voltages $U_S$ (photo-sensitive elements S) and $U_C$ (capacitor C) are then added.

The charge $Q_a$ supplied to the capacitor C during the time $t_a$ is $Q_a = I_S \cdot t_a$.

It is also equal to the products of the variation $\Delta U_C$ of the voltage on the terminals of the capacitor by the value of the capacitor C: $Q_a = \Delta U_C \cdot C$ Whence $$\Delta U_C = \frac{I_S \cdot t_a}{C}$$

which makes it possible to select C and $t_a$ to keep $\Delta U_C$ below a given value, $I_S$ being known.

If it is assumed that:
$t_a = t_b = t/2$ (See FIG. 3);
$U_S$ = constant (the inner resistance of the photo-sensitive elements = 0);
$U_A$ = constant (the inner resistance of the accumulator = 0);

$$\frac{\Delta U_C}{U_C} - < < 1;$$

and
$R_{K1} = R_{K'1} = R$(the contact resistances of the two switches K1 and K'1 are equal, in both positions of the switches); then
we may write: during
$t_a$: $U_S = I_a \cdot 2R + U_C$
during $t_b$: $U_S = I_b \cdot 2R - U_C + U_A$ Operating normally, the charge $Q_a$ supplied to the capacitor by the photo-sensitive elements during the time $t_a$ is equal to the charge $Q_b$ supplied by the capacitor to the accumulator during the time $t_b$; therefore the currents $I_a$ and $I_b$ are also equal to each other. They are also equal to the current supplied by the photo-sensitive elements $$I_a = I_b = I_S$$

hence:

$$I_S = \frac{U_S - \frac{1}{2} \cdot U_A}{2R}$$

It will therefore be seen that the current fed by the photo-sensitive elements is independent of time and is equal to the short circuit current of a source which would have a voltage in vacuo $U_S - \frac{1}{2} \cdot U_A$ and an internal resistance 2R. The instantaneous current fed to the accumulator will be constant during the time $t_b$ and zero during the time $t_a$. The average current fed to the accumulator will therefore be:

$$\bar{I}_A = \frac{I_S}{2}$$

Consequently the yield $f$ of the converter is as follows:

$$\tau = \frac{U_A}{2U_S}$$

The converter works like a voltage transformer: the output voltage is twice the input voltage, the output current half the input current. The impedances are also transformed in a ratio of 1 to 4, that is to say, the series resistance "seen" by the photo-sensitive elements is 2R, and that "seen" by the accumulator is 8R.

The switches K1 and K'1 may be obtained by means of the MOS transistors: the characteristic $I_D = f(U_{DS})$ of one of these transistors, in the vicinity of $I_D = 0$, is approximately linear. In this case, the hypothesis of a constant contact resistance R is justified. On the other hand, for relatively high voltages, the MOS transistors are saturated and limit the current. It will be seen subsequently that this property makes it possible to allow the converter to function even when the lighting is very good and the voltage supplied by the photo-sensitive elements is sufficient to recharge the accumulator without the aid of the converter. In this case, only one part of the current supplied by the photo-sensitive elements passes through the converter. The remainder which, for intense lighting, may reach 90% of the current supplied, passes directly through the diode D1.

FIG. 4 shows qualitatively the current $I_A$ absorbed by the accumulator as a function of the lighting E. The references $I_D$, $I_C$ $I_{C + D}$ respectively indicate the currents passing through the diode D1, the converter and the "diode-converter" assembly. It will be seen that even in the region where the diode is conductive, the presence of the converter improves the use of the available energy. In fact, without the converter, the photo-sensitive elements would work too close to their voltage in vacuo $U_0$, that is to say, in unfavourable conditions.

It is possible to generalize the principle of the converter shown in FIG. 3. FIG. 5 shows, for example, a voltage quadrupler based on the same principle. The references are the same as before, only the indices differentiate the terminals of the switches.

FIG. 6 shows the construction of the converter according to FIG. 3 in C — MOS technology.

The transistors T1, T3 and T5 are of P type, the transistors T2, T4 and T6 are of N type.

The switch K1 of FIG. 3 is replaced by the transistors T1, T2 and T3, whilst the switch K'1 is replaced by the transistors T4, T5 and T6. The signal indicated by C1 and its inverse $\overline{C1}$ play the part of the signal W of FIG. 3. They are also provided by the user circuit H.

Operation is as follows:

During the time $T_a$, the signal C1 is negative, the signal $\overline{C1}$ is positive. The transistor T1 is conductive and connects the positive poles of the capacitor C and of the photo-sensitive elements S; the transistors T4 and T5 are also conductive and connect the negative poles of the capacitor C and the photo-sensitive elements S. The capacitor C is therefore connected in parallel with the photo-sensitive elements, as when the switches K1 and K′1 were in their position a1 and a′1 respectively, in the case of FIG. 3.

During the time $t_b$, the signal C1 is positive and the signal $\overline{C1}$ negative. This time the transistors T2 and T3 are conductive and connect the positive pole of the capacitor C to the negative pole of the photo-sensitive elements S. The transistor T6 is also conductive and connects the negative pole of the capacitor C to the negative terminal of the accumulator A. The capacitor C is therefore connected in series with the photo-sensitive elements S and it charges the accumulator A as when the switches K1 and K′1 were in their position b1 or b′1, respectively, in the case of FIG. 3.

If the accumulator is intended to supply a watch, the components of the converter may be integrated in the same circuit as the other components of the watch. The integration of the MOS transistors of P type do not present any difficulty. Their substrate and their source are connected to the positive pole of the accumulator, that is to say, to the most positive potential of the circuit. The control signals applied to their gate may reach this potential and therefore ensure their blockage when this is necessary.

The integration of N type transistors, on the other hand, raises a small problem: in fact, the sources of the transistors T2 and T4 are connected to the most negative point of the circuit which is the negative pole of the photo-sensitive element. The signal C1 and $\overline{C1}$, which engage their gate, are supplied by the user circuit H, the negative pole of which is connected to the negative pole of the accumulator. However, the diode D1 is located between the negative pole of the accumulator and the negative pole of the photo-sensitive elements. In the event of strong light, a powerful current passes through this diode, producing a drop in voltage of the order of 0.5V. The negative pole of the accumulator will therefore always be more positive than the negative pole of the photo-sensitive element. The result is that signals C1 and $\overline{C1}$ will therefore always be positive compared with the sources of the transistors T2 and T4, and hence the latter will never be perfectly blocked. This phenomenon does not matter, because it occurs only when the light is strong, the charging current then being provided mainly by way of the diode D1.

The circuits of FIGS. 3 and 6 have a disadvantage: if the light is weak, the accumulator A may supply a reverse current which charges the capacitor C when the switches are in their positions b or when the transistors T2, T3 and T6 are conductive. The capacitor may then discharge into the photo-sensitive elements S when the switches are in their position a or when the transistors T1, T4 and T5 are conductive.

A diode D2, shown in broken lines in FIGS. 3 and 6, would make it possible to avoid this disadvantage, but it would then be necessary that:

$$U_S + U_C \leq U_A + U_{D2}$$

so that the capacitor can discharge into the accumulator, the diode D2 introducing a further loss.

FIG. 7 shows the principle of an alternative arrangement of the invention in which the converter is arranged to eliminate this reverse current without having to overcome the voltage $U_{D2}$. In this FIG. 7, the capacitor C is connected between two switches K6 and K′6 which have the same function as the switches K1 and K′1 of FIG. 3. As in the case shown by this FIG. 3, the capacitor C is connected in parallel with the photo-sensitive elements S during the time $t_a$, and in series during the time $t_b$. An extra switch K7, normally in position a7, prevents the capacitor C discharging into the accumulator A if the voltage $U_M = U_S = U_C$, which appears at the input Mc of a measurement circuit M, does not exceed a certain threshold $U_{MO}$. If $U_M$ exceeds $U_{MO}$, when the circuit M causes the switch 7 to swing into its position b7 and the capacitor can discharge into the accumulator A. At the end of the time $t_b$, the switches K6 and K′6 resume their position a. At the same time S7 resumes its position a7.

It will therefore be seen that, due to this extra switch K7, the accumulator A cannot discharge into the capacitor C and from there into the photo-sensitive elements S.

FIG. 8 shows the configuration in C — MOS technology of the converter shown schematically in FIG. 7 with the measurement circuit M, formed of transistors T7 and T8 and a bistable circuit B, composed of two interconnected NAND gates. The other components shown in this FIG. 8 have the same function as the corresponding components in FIG. 6. The measurement circuit M which controls the changeover of K7 comprises a P type transistor T7 having a long narrow channel, and polarised so as always to be conductive. Due to its form, its saturation current is relatively weak. This transistor T7 is connected in series with an N type transistor T8, having a short wide channel, therefore capable of allowing a relatively strong current to pass through with a slight drop in voltage. The gate of this transistor T8 is connected to the negative pole of the accumulator A. The transistor T8 is also connected to the negative electrode of the capacitor C and to the transistor T6 which performs the function of the switch K7 in FIG. 7. The control input B1 of the bistable B is connected to the junction point of the transistors T7 and T8. The other control input B2 is connected to the signal C1. The output B3 of the bistable B engages the gate of the transistor T6. Operation of this circuit is as follows:

When the signal C1 is negative, that is to say, during the time $t_a$, the transistors T1, T4 and T5 are conductive, the bistable B is in a logic state keeping the transistor T6 locked; the capacitor C is then in parallel with the photo-sensitive elements S.

When C1 is positive, that is to say, during the time $t_b$, the transistor T2 and T3 become conductive, whilst the transistor T1 is blocked. The voltage $U_M = U_S + U_C$ appears at the input Mc of the measurement circuit, that is to say, at the source of the transistor T8; if this voltage $U_M$ exceeds the value $U_{MO} = U_A + U_{th8}$, in which $U_{th8}$ is the threshold voltage of the transistor T8, the latter begins to conduct, the input B1 of the bistable B becomes negative and the bistable swings. Its output B3 applies a positive potential to the gate of the transistor T6 which becomes conductive. The capacitor C can then discharge into the accumulator A. At the moment when T6 becomes conductive, T8 is blocked again. At the end of the time $t_b$, the signal C1 becomes negative again, the effect of which is to swing the bistable B and consequently block the transistor T6 again. When T6 is conductive, the condition for C to discharge into A is:

$$U_S + U_C \leq U_{DS6} + U_A$$

in which $U_{DS6}$ is the drain-source voltage of the transistor T6. However, this voltage may be made very weak by carefully selecting the dimensions of T6. It would therefore be seen that the circuit in FIG. 8 eliminates the reverse current which may circulate in the circuits of the diagrams shown in FIGS. 3 and 7, without causing a drop in voltage in the diode D2.

But the circuit in FIG. 8 has, despite everything, the drawback that the voltage of point Mc for producing the swing of the bistable is:

$$U_{Mc} = U_A + U_{th8}$$

and not $U_{Mc} = U_A$, which would be the ideal case.

FIG. 9 shows the diagram of another measurement circuit which satisfies the condition $U_{Mc} = U_A$.

This measurement circuit is composed of the P type transistors T11 and T12, having a low saturation current, and transistors T13, 14 and T15 and T16 of N type. The control circuit of T6 comprises a flip-flop of type D. The variation in function of the time of the different signals C1, $\overline{C1}$, P1 and P2 which engage the circuit is described by FIG. 10. The operation of the circuit is as follows:

during the time $t_a$ the signals P1 and P2 are positive. The transistors T11 and T12 are blocked, and the transistors T13 and T14 are conductive, which renders the point D negative. The signal $\overline{C1}$ is also positive which forces the output $\overline{Q}$ of the flip-flop to a negative potential. The transistor T6 is therefore blocked. Furthermore, the capacitor C is connected in parallel with the photo-sensitive elements, as described above. At the beginning of the time $t_b$, the signals $\overline{C1}$ and P1 become negative and the signal C1 positive, which changes nothing in the state of the measurement circuit, but causes the connection in series of the capacitor C and the photo-sensitive elements S. After a time $t_{b1}$, the signal P2 in turn becomes negative. The transistors T13 and T14 are blocked and the transistors T11 and T12 become conductive. The transistors T15 and T16 are then polarised so that the difference in potential between their sources is once again amplified, on their drain. Hence, if the point Mc, which is connected to the source of T15 is positive compared with the negative pole of the accumulator A, which is connected to the source of T16, the point D, which is connected to the drain of T15, becomes positive. If, on the other hand, the point Mc is negative compared with the negative pole of the accumulator, then the point D becomes negative. Whatever the potential taken by D, the output $\overline{Q}$ of the flip-flop 10 still does not change its state and T6 remains blocked.

At the end of the time $t_{b2}$, the signal P1 becomes positive again. At this moment the state of the input D of the flip-flop 10 is transmitted, inverted, to the output $\overline{Q}$. If D is positive, $\overline{Q}$ remains negative and T6 remains blocked, preventing the accumulator charging the capacitor C. If D is negative, $\overline{Q}$ becomes positive and T6 conductive. The capacitor can then discharge into the accumulator A.

At the end of the time $t_{b3}$, the signal P2 becomes positive again. The transistors T11 and T12 are blocked, and the transistors T13 and T14 become conductive again. The state of the output $\overline{Q}$ of the flip-flop 10 and therefore of the transistor T6, remain unchanged.

At the end of the time $t_b$, the signal C1 becomes positive again, once more forcing the output $\overline{Q}$ of the flip-flop to assume the negative state, therefore blocking the transistor T6. It will therefore be seen that this device causes the switching of T6 for a voltage $U_{Mc}$ scarcely more negative than the voltage $U_A$. The voltage $U_{th8}$ which had to be overcome in the circuit of FIG. 8 to cause the switching of T6, does not exist. The circuit in FIG. 9 is therefore more sensitive, although at the cost of a complication due to the necessity of creating the signals P1 and P2. It should also be noted that the sum of the times $t_{b2}$ and $t_{b3}$ should be as low as possible to limit the losses which occur when the transistors T11 and T12 are conductive. On the other hand, $t_{b1}$ and $t_{b3}$ may be very short; they only serve to ensure correct operation of the flip-flop 10 and it would be sufficient to provide them by connecting two inverters in series between the signals P1 and P2.

The basic principle of the circuit in FIG. 9, may be generalised as shown in FIG. 11;

The switches K10, K'10, K12, K'12, K13, and K'13 operate synchronously, like the switches K6 and K'6 in the diagram of FIG. 7. The switches K11 and K14 are controlled by the measurement circuits M1 and M2 respectively. When K10 and K'10 are in position b10, the circuit M1 measures a voltage $U_{M1} = U_S + U_{C10}$. For a certain level of illumination $E_{x1}$, this voltage $U_{M1}$ exceeds the voltage $U_A$. In this case, M1 causes the swinging of K11 into its position b11, thus connecting the negative pole of the accumulator A to the negative pole of the capacitor C10. The charging current of the accumulator A, therefore does not flow into the switches K12 to K14. If the illumination does not reach the value $E_{x1}$, $U_{M1}$ is weaker than $U_A$. In this case M1 retains the switch K11 in its position a11. The circuit M2 then measures a voltage $U_{M2} = U_S + U_{C10} + U_{C12} + U_{C13}$. Again, if the illumination reaches a level $E_{x2}$, the voltage $U_{M2}$ exceeds the voltage $U_A$. The circuit M2 then swings K14 into its position b14 and the negative pole of the accumulator A is connected to the negative pole of the capacitor C13. In this case, the charging current of the accumulator A, which is weaker than in the preceding case in which the illumination exceeded the level $E_{x1}$, passes through the switches K12 to K14 and through the capacitors C12 and C13. If the illumination does not reach the value $E_{x2}$, the circuit M2 keeps K14 in its position a14 and no current circulates in the device. Therefore the accumulator cannot discharge into the solar cells S.

It will therefore be seen that the switches K11 and K14 prevent the operation of a converter stage if the preceding stage is already supplying a sufficient voltage. It would therefore be possible to take a measurement at the input of the converter in MO to prevent any switching if the illumination is strong. But we have already seen that in this case the greater part of the energy is directly supplied to the accumulator A through the diode D1. The reduction in output caused by the operation of the converter is not sufficient in this case to justify the complication caused by this extra measurement in MO. The switches K10 to K14 and the measurement circuits M1 and M2 of FIG. 11, may of course be replaced by circuits using MOS transistors in a manner similar to that described in the case of FIG. 9. From what has already been stated above, we have seen that the switches K12 to K14 are not traversed by a current except when the illumination is weak. The result is that the MOS transistors intended to replace these switches may have small dimensions. Conversely, the switches K10, K'10 and K11 must be able to allow a stronger current to flow through them when the illumination is stronger. The MOS transistors which replace them must have a suitable dimension therefore. Finally, diode D1 must be able to allow a sufficiently high current to pass through when the solar cells are for example exposed to full sunlight. In practice it will be necessary to dimension the various components so that they can take approximately the following currents:

| | |
|---|---|
| Diode D1 | 2ma (cells in full sunshine) |
| Transistors replacing the switches K10 to K14 | 0.1 ma (average light) |
| Transistors replacing the switches K12 to K14 | 0.02 ma (poor light) |

It is obvious that in a circuit similar to that of FIG. 11, the number of sections of the converter, each comprising a capacitor and the necessary switches, and the number and positioning of the measurement points, may be freely selected, so that the energy supplied by the photo-sensitive elements is always maximally utilized. The circuit in FIG. 11 is only one possible embodiment.

FIG. 12 shows another basic converter making it possible to exploit rationally the photo-sensitive elements. This converter comprises a coil having an inductance L and an internal resistance $R_L$. A switch K15 can assume two positions a15 and b15. A diode D1 plays the same part as in the previously described circuits. The operation of this converter is as follows:

The switch K15 is controlled by a signal W15 produced, in a manner not shown, by the load circuit H, so that it is in position a15 during the time $t_a$ and in position b15 during a time $t_b$. As we shall see below, these times $t_a$ and $t_b$ may vary, but the sum t thereof remains constant. The voltages $U\phi$ will therefore have the value "0" during the time $t_a$ and the value $U_A$ during the time $t_b$. Its mean value $U\phi$ will thus be:

$$U_u = U_A \cdot \frac{t_b}{t_a + t_b}$$

or again, by assuming $$\frac{t_b}{t_a + t_b} = \phi t$$

$$U_4 = \phi t \, U_A$$

The time constant of the inductivity $T = (L/R_L)$ is selected much larger than the time $t = t_a + t_b$. The frequency $f = (1/t)$ of the repetition of the signal $W_{15}$ is fixed. Hence, the inductance acts like a "steering wheel" and keeps the current I relatively constant despite the rapid variation of the voltage $U\phi$. Whilst assuming, as above, that the internal resistance of the photo-sensitive elements is zero, and the value of this current is given by:

$$I = \frac{U_S - \overline{U\phi}}{R_L}$$

This current I is supplied to the accumulator when K15 is in position b15, even if $\underline{U}_S$ is smaller than $U_A$. It is sufficient to operate so that $\overline{U\phi}$ is less than $U_S$.

The device works like a voltage transformer having a transformation ratio equal to $\phi$.

Whilst admitting that the internal resistance of the photo-sensitive elements and of the accumulator are zero (ideal case), the efficiency $\eta$ of the device may be calculated:

$$\eta = \frac{\overline{P}_A}{P_S}$$

knowing that $$\overline{P}_A = U_A \cdot \overline{I}_A;$$

$$P_S = U_S \cdot I;$$

$$\overline{I}_A = I \cdot \phi;$$

$$U_A = \frac{U_\phi}{\phi};$$

and that $\quad U_\phi = U_S - R_1 \cdot I;$ we may write $\quad \eta = 1 - \frac{R_1 \cdot I}{U_S}.$ It will therefore be seen that if $R_L = 0$, the power supplied by the photo-sensitive elements is entirely absorbed by the accumulator.

It is already known furthermore that it is possible to vary the duty cycle of a signal as a function of the illumination received by a photo-sensitive element. This technique is employed for example to to vary the quantity of light emitted by a watch display having electroluminescent diodes as a function of the lighting conditions. We shall therefore limit ourselves to describing how the cyclic ratio $\phi$ should vary;

For very weak illumination it is necessary the $\phi = 0$, for the losses in the converter (that is to say in the resistance $R_L$) would absorb all the energy furnished by the photo-sensitive elements. It will be seen that in this case it is necessary that $t_b = 0$, that is to say, that the switch K15 remains in position a15. For increasing lighting, it is necessary that $\phi$ should also increase to reach the value $\phi = 1$ for an illumination such that the diode D1 begins to conduct. At this moment it is necessary that $t_a = 0$, that is to say, the switch K15 remains in position b15. The converter is then inactive and is simply connected in parallel with the diode D1.

The switch K15 of FIG. 12 may be formed by means of a N type transistor and a P type transistor, the gates of which are controlled in parallel so that during the time $t_a$, one of the transistors conducts, the other being blocked, and conversely during the time $t_b$.

Other applications of the above described device may be considered. For sighting radio beacons at sea, radio telephones in mountain huts, television re-transmitters located in regions of difficult access and even the partial supply of electric energy to dwelling houses. For all these applications, in the distant regions of the equator, where the sunshine may vary in great proportions, the device according to the invention considerably improves the yield of solar cells.

I claim:

1. A device for enabling the recharging of an accumulator having two terminals with a current from a source capable of transforming an incident energy into electrical energy, the source having at least two terminals, said device comprising diode means directly connected between the source and the accumulator for enabling the recharging of the accumulator directly from the source when the latter exceeds a predetermined value; and converter circuit means directly connected in parallel with said diode means between the source and the accumulator and comprising, storage means for storing electrical energy when connected to the source and for providing electrical energy when connected to the accumulator, a first input terminal, a second input terminal, said first and second input terminals being directly connected to the terminals of the source, an output terminal connected to one of the terminals of the accumulator, switching means capable of being periodically operated for connecting in a first position thereof said input terminals, and hence said source, to said storage means in parallel therewith for the charging of said storage means, and for connecting in a second position of said switching means said charged storage means to said second input terminal and said output terminal, and hence connecting said charged storage means directly in series between the source and the accumulator; said converter means delivering a charging current to the accumulator when the voltage at the output terminal exceeds the voltage of the accumulator; and said diode means when said switching means is in a first position thereof for preventing a reverse current being delivered to said storage means and the source by the accumulator when the voltage of the accumulator exceeds the voltage of the source.

2. A device according to claim 1, wherein the said converter means comprises two output terminals, and at least two switching means, each switching means having two positions and said switching means being respectively connected to said input and output terminals, and said storage means comprises at least one capacitor which is connected between said switching means; and further comprising a control means for periodically and synchronously actuating said switching means at a predetermined frequency as a result of a signal generated outside said converter means being applied to said control means such that in one of said two positions of said switching means, said capacitor is connected directly in parallel with the source and in the other position of said switching means said capacitor is connected in series with the source and with the accumulator.

3. A device according to claim 2 in which the said switching means are constructed using semi-conductor elements.

4. A device according to claim 1, wherein said converter means further comprises two output terminals, and said storage means comprises an inductance that is connected to said switching means; and further comprising a control means for periodically actuating said switching means at a predetermined frequency as a result of a signal generated outside said converter means being applied to said control means such that in one of said two positions said inductance is connected directly in parallel with the source and in the other position said inductance is connected in series with the source and with the accumulator.

5. A device according to claim 4 in which the duty cycle of the said signal is variably applied to said control means as a function of the incident energy received by the said source.

6. A device according to claim 4 in which the said switching means is constructed using semi-conductor elements.

7. A device for enabling the recharging of an accumulator by means of a current from a source capable of transforming an incident energy into electrical energy, said source having at least two terminals, said device comprising diode means; and converter circuit means comprising at least two inputs and one output, said two inputs being connected to the terminals of the source, said diode means being connected between one of said inputs and said output, at least one assembly formed by a capacitor and a plurality of switch means having two positions, at least two of the switch means being synchronously controllable at a predetermined frequency and connected so that in one of said two positions said capacitor is connected in parallel with the source, and in the other position said capacitor is connected in series with the source and with the accumulator, and a third switch means having two positions for connecting and disconnecting said capacitor and the accumulator; and a measurement circuit connected to said capacitor for receiving the sum of the voltages of the source and of said capacitor when they are connected in series, for keeping said third switch in its first position when said sum of the voltages is greater than the voltages of the accumulator, thus enabling the recharging of the accumulator, and for switching said third switch to its second position disconnecting the accumulator from the capacitor when said sum of the voltages is less than the voltage of the accumulator, thus preventing the discharge of the accumulator into said capacitor.

8. A device according to claim 7 in which the said switch means are constructed using semi-conductor elements.

9. A device for enabling the recharging of an accumulator having two terminals said device comprising a photosensitive source capable of transforming an incident energy into electrical energy, the source having at least two terminals;

diode means directly connected between said source and the accumulator for enabling the recharging of the accumulator directly from said source when the latter exceeds a predetermined value; and converter circuit means directly connected in parallel with said diode means between said source and the accumulator and comprised of elements integrated in an integrated circuit, said converter circuit means comprising, storage means for storing electrical energy when connected to said source and for providing electrical energy when connected to the accumulator, said storage means having two terminals, a first input terminal, a second input terminal, said first and second input terminals being directly connected to the terminals of said source, an output terminal connected to one of the terminals of the accumulator, switching means capable of being periodically operated for connecting in a first position thereof said input terminals, and hence said source, to said storage means in parallel therewith for the charging of said storage means, and for connecting in a second position of said switching means said charged storage means to said second input terminal and said output terminal, and hence connecting said charged storage means directly in series between said source and the accumulator, said switching means comprised of semi-conductor transistors that are capable of limiting the current therethrough when saturated; and said diode means when said switching means is in a first position thereof for preventing a reverse current being delivered to said storage means and said source by the accumulator when the voltage of the accumulator exceeds the voltage of said source.

10. A device according to claim 9 and further comprising means for generating a control signal having a predetermined frequency; wherein said converter circuit means further includes a second output terminal directly connected to said one source terminal, said diode means being connected between said output terminals; and wherein said switching means comprises first and second switch means, said first switch means comprising a first transistor and a second transistor, said first transistor directly connected between said first input terminal and said one storage means terminal and said second transistor directly connected between said one storage means terminal and said second input terminal, and said second switch means comprising a third transistor and a fourth transistor, said third transistor directly connected between said second storage means terminal and said first output terminal and said fourth transistor directly connected between said second storage means terminal and said second output terminal; said generating means being connected to the control input of at least said first, second and fourth transistors for the periodic switching thereof.

* * * * *